(12) United States Patent
Bronk et al.

(10) Patent No.: US 12,487,280 B2
(45) Date of Patent: Dec. 2, 2025

(54) APPARATUSES, METHODS AND COMPUTER PROGRAMS FOR EXECUTING AN EXECUTABLE, AND METHOD FOR DISTRIBUTING SOFTWARE OR FIRMWARES

(71) Applicant: Intel Corporation, Santa Clara, CA (US)

(72) Inventors: Mateusz Bronk, Gdansk (PL); Arkadiusz Berent, Tuchom (PL); Piotr Zmijewski, Gdansk (PL); Krystian Matusiewicz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 18/307,214

(22) Filed: Apr. 26, 2023

(65) Prior Publication Data

US 2023/0258713 A1    Aug. 17, 2023

(51) Int. Cl.
*G06F 11/36* (2025.01)
*G01R 31/317* (2006.01)
(Continued)

(52) U.S. Cl.
CPC .... *G01R 31/31709* (2013.01); *G06F 11/3688* (2013.01); *G06F 21/75* (2013.01)

(58) Field of Classification Search
CPC .................................................. G06F 21/75
See application file for complete search history.

(56) References Cited

U.S. PATENT DOCUMENTS 7,814,308 B2 * 10/2010 Templin .................. G06F 21/53
  717/124
8,879,724 B2 * 11/2014 Kocher .................... G09C 1/00
  380/1
(Continued)

FOREIGN PATENT DOCUMENTS

EP         4012593 A1    6/2022
WO      2015088525 A1    6/2015

OTHER PUBLICATIONS

D. Das, et al "High efficiency power side-channel attack immunity using noise injection in attenuated signature domain," 2017 IEEE International Symposium on Hardware Oriented Security and Trust (HOST), Mclean, VA, USA, 2017, pp. 62-67, doi: 10.1109/HST.2017.7 (Year: 2017).*

(Continued)

*Primary Examiner* — Rupal Dharia
*Assistant Examiner* — Devin E Almeida
(74) *Attorney, Agent, or Firm* — 2SPL Patent Attorneys PartG mbB; Kieran O'Leary (57) ABSTRACT

Various examples relate to apparatuses, methods, and computer programs for executing an executable, and to a method for distributing software or firmware. An apparatus for executing an executable comprises interface circuitry, machine-readable instructions, and processing circuitry for executing the machine-readable instructions to identify, for the executable, a trigger to activate or deactivate a noise injection mode during execution of the executable, the noise injection mode being suitable for introducing noise during execution of the executable, and activate or deactivate the noise injection mode based on the identified trigger.

22 Claims, 3 Drawing Sheets

(51) Int. Cl.
*G06F 11/3668* (2025.01)
*G06F 21/75* (2013.01)

(56) References Cited

U.S. PATENT DOCUMENTS

| | | | | |
|---|---|---|---|---|
| 10,242,200 | B1* | 3/2019 | Young | G06F 16/9017 |
| 2010/0031375 | A1* | 2/2010 | Bartley | G06F 21/75 |
| | | | | 726/34 |
| 2010/0095133 | A1* | 4/2010 | Peter | H04L 9/003 |
| | | | | 380/59 |
| 2013/0111204 | A1* | 5/2013 | Gunnam | G06F 21/755 |
| | | | | 713/150 |
| 2015/0373035 | A1 | 12/2015 | Patne et al. | |
| 2018/0083982 | A1* | 3/2018 | Asenjo | H04L 63/0428 |
| 2018/0316489 | A1* | 11/2018 | Kose | H04L 9/003 |
| 2020/0167505 | A1* | 5/2020 | Rivoir | G06F 21/755 |
| 2024/0126587 | A1* | 4/2024 | Minakshi | G06F 9/45558 |
| 2024/0129104 | A1* | 4/2024 | Fung | H04L 9/003 |

OTHER PUBLICATIONS

D. Das, M. Nath, B. Chatterjee, S. Ghosh and S. Sen, "STELLAR: a Generic EM Side-Channel Attack Protection through Ground-Up Root-cause Analysis," 2019 IEEE International Symposium on Hardware Oriented Security and Trust (HOST), McLean, VA, USA, 2019, pp. 11-20, doi: 10.1109/HST.2019.8740839. (Year: 2019).*

Liu Chen et al "Frequency Throttling Side-Channel Attack", Proceedings of The 2022 ACM SIGSAC Conference on Computer and Communications Security, ACMPUB27, New York, NY, USA, Nov. 7, 2022, pp. 1977-1991, XP058955503, DOI: 10.1145/3548606. 3560682, ISBN: 978-1-4503-9466-6, Section 4.2.2., paragraph "Techniques to reduce Minimum Time to Disclosure".

Chen et al., Side-Channel Leaks in Web Applications: a Reality Today, a Challenge Tomorrow, 2010 IEEE Symposium on Security and Privacy (2010).

Vateva-Gurova et al., On the Detection of Side-Channel Attacks, 2018 IEEE 23rd Pacific Rim International Symposium on Dependable Computing (2018).

Wang et al., SCARF: Detecting Side-Channel Attacks at Real-time using Low-level Hardware Features, 26th IEEE Internatonal Symposium on On-Line Testing and Robust System Design (2020).

Cruze D., Wannacry ransomware cyber attack: Indian ATMs could be at high risk as most run on Windows XP, Business Today (May 15, 2017), https://www.businesstoday.in/latest/economy-politics/story/wannacry-ransomware-cyber-attack-indian-atms-high-risk-windows-xp-78279-2017-05-15.

Pin—A Dynamic Binary Instrumentation Tool, INTEL (last visited Mar. 7, 2023), https://www.intel.com/content/www/us/en/developer/articles/tool/pin-a-dynamic-binary-instrumentation-tool.html.

Windows Defender Application Control and AppLocker feature availability, Microsoft (last visitedMar. 7, 2023) https://learn.microsoft.com/en-us/windows/security/threat-protection/windows-defender-application-control/feature-availability.

Intel Threat Detection Technology (Intel TDT), Intel (last visited Apr. 26, 2023), https://www.intel.com/content/www/us/en/architecture-and-technology/vpro/hardware-shield/threat-detection-technology.html.

* cited by examiner

APPARATUSES, METHODS AND COMPUTER PROGRAMS FOR EXECUTING AN EXECUTABLE, AND METHOD FOR DISTRIBUTING SOFTWARE OR FIRMWARES

BACKGROUND

Side-channel attacks on software are techniques used to extract sensitive information by measuring behavior-related data. These attacks typically exploit the computer's power consumption, electromagnetic radiation, or timing behavior. Examples of side-channel attacks include, but are not limited to, power analysis, electromagnetic analysis, acoustic analysis, and cache-based attacks. Side-channel attacks (SCAs) have become increasingly popular, to the point where new techniques and classes of threats emerge at a pace where even software development lifecycle methods and policies hardly keep up. Even a software component considered "secure" today, may be vulnerable to future threats.

In an ideal situation, the software is still maintained and patchable so any newly found threat can be analyzed, vulnerability corrected in code, and a new version released with a fix. In reality, some code may have a very long lifespan, or be too difficult to re-deploy. As a result, old software is still in use well after its support period has ended. This is a real-world concern, especially in highly regulated or specialized domains, such as industrial, financial, healthcare or military/government, where each simple change needs to undergo a costly testing and re-certification process and the "risk of change" is high enough that even upgrading to a patched version may be considered too risky. Moreover, in some cases, a patch simply cannot be produced, e.g., due to the software being integrity-protected from tampering (e.g., by a signature) and the original software vendor no longer in business, source code not being available and/or signing keys used to sign the software no longer being available.

BRIEF DESCRIPTION OF THE FIGURES

Some examples of apparatuses and/or methods will be described in the following by way of example only, and with reference to the accompanying figures, in which.

DETAILED DESCRIPTION

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

In the following description, specific details are set forth, but examples of the technologies described herein may be practiced without these specific details. Well-known circuits, structures, and techniques have not been shown in detail to avoid obscuring an understanding of this description. "An example/example," "various examples/examples," "some examples/examples," and the like may include features, structures, or characteristics, but not every example necessarily includes the particular features, structures, or characteristics.

Some examples may have some, all, or none of the features described for other examples. "First," "second," "third," and the like describe a common element and indicate different instances of like elements being referred to. Such adjectives do not imply element item so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform, or resource, even though the instructions contained in the software or firmware are not actively being executed by the system, device, platform, or resource.

The description may use the phrases "in an example/example," "in examples/examples," "in some examples/examples," and/or "in various examples/examples," each of which may refer to one or more of the same or different examples. Furthermore, the terms "comprising," "including," "having," and the like, as used with respect to examples of the present disclosure, are synonymous.

Figure 1A:
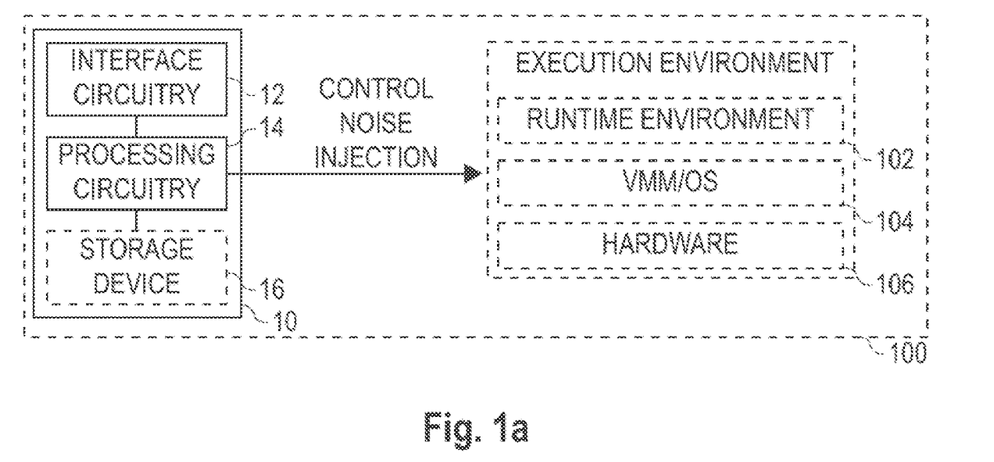
FIG. 1a shows a schematic diagram of an example of an apparatus or device for executing an executable, and of a computer system comprising such an apparatus or device.

FIG. 1a shows a schematic diagram of an example of an apparatus 10 or device 10 for executing an executable, and of a computer system 100 comprising such an apparatus 10 or device 10. The apparatus 10 comprises circuitry to provide the functionality of the apparatus 10. For example, the circuitry of the apparatus 10 may be configured to provide the functionality of the apparatus 10. For example, the apparatus 10 of FIG. 1a comprises interface circuitry 12, processing circuitry 14 and (optional) storage circuitry 16. For example, the processing circuitry 14 may be coupled with the interface circuitry 12 and with the storage circuitry 16. For example, the processing circuitry 14 may provide the functionality of the apparatus, in conjunction with the interface circuitry 12 (for exchanging information, e.g., with other components inside or outside the computer system 100 comprising the apparatus or device 10) and the storage circuitry 16 (for storing information, such as machine-readable instructions). Likewise, the device 10 may comprise means for providing the functionality of the device 10. For example, the means may be configured to provide the functionality of the device 10. The components of the device 10 are defined as component means, which may correspond to, or implemented by, the respective structural components of the apparatus 10. For example, the device 10 of FIG. 1a comprises means for processing 14, which may correspond to or be implemented by the processing circuitry 14, means for communicating 12, which may correspond to or be implemented by the interface circuitry 12, and (optional) means for storing information 16, which may correspond to or be implemented by the storage circuitry 16. In general, the functionality of the processing circuitry 14 or means for processing 14 may be implemented by the processing circuitry 14 or means for processing 14 executing machine-readable instructions. Accordingly, any feature ascribed to the processing circuitry 14 or means for processing 14 may be defined by one or more instructions of a plurality of machine-readable instructions. The apparatus 10 or device 10 may comprise the machine-readable instructions, e.g., within the storage circuitry 16 or means for storing information 16.

The processing circuitry 14 or means for processing 14 is to identify, for the executable, a trigger to activate or deactivate a noise injection mode during execution of the executable. The noise injection mode is suitable for introducing noise during execution of the executable.

The processing circuitry 14 or means for processing 14 is to activate or deactivate the noise injection mode based on the identified trigger.

Figure 1B:
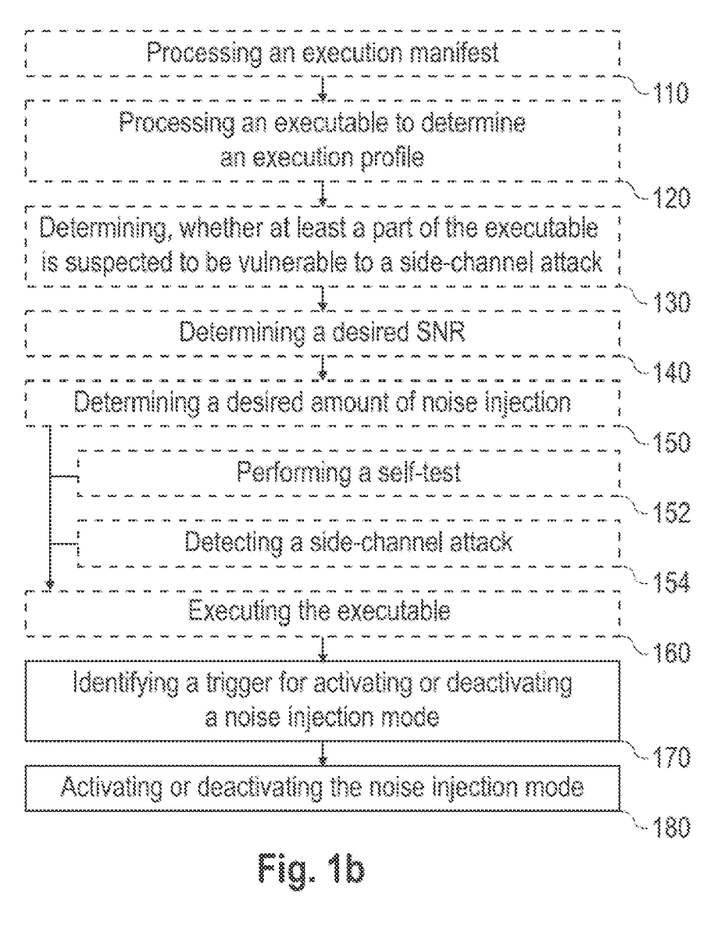
FIG. 1b shows a flow chart of an example of a method for executing an executable.

FIG. 1b shows a flow chart of an example of a corresponding method for executing the executable. The method comprises identifying 170, for the executable, the trigger to activate or deactivate a noise injection mode during execution of the executable, the noise injection mode being suitable for introducing noise during execution of the executable. The method comprises activating or deactivating 180 the noise injection mode based on the identified trigger. For example, the method may be performed by the computer system 100, e.g., by the apparatus 10 or device 10 of the computer system.

In the following, the functionality of the apparatus 10, the device 10, the method and of a corresponding computer program is illustrated with respect to the apparatus 10. Features introduced in connection with the apparatus 10 may likewise be included in the corresponding device 10, method and computer program.

Various examples of the present disclosure relate to a temporary injection of noise during execution of an executable (i.e., a compiled software program). As outlined above, the safety and confidentiality of the execution of software can sometimes be compromised by side-channel attacks. Side-channel attacks on software are techniques used to extract sensitive information by measuring behavior-related data. These attacks typically exploit the computer's power consumption, electromagnetic radiation, or timing behavior. Examples of side-channel attacks include power analysis, electromagnetic analysis, acoustic analysis, and cache-based attacks. To thwart such attack vectors, in the present disclosure, a so-called noise-injection mode is used to introduce noise, and in particular unexpected variability, during execution of the executable. For example, to thwart attacks that rely on highly precise timing, a random or deterministic (e.g., pseudorandom, as it is unknown to the attacker, but potentially known to protected system) delay may be (artificially) introduced among original instructions to obscure the real timing of the original instruction sequence, to make it difficult or impossible to gain a knowledge about the real timing and to make the attacker to observe a different (not real) timing. This prevents an attacker from being able to guess meaningful information which could be used to leak secrets, for example. For example, such delays may be introduced when a jump or return operation is performed (which can easily be timed), or during execution of critical code (e.g., encryption-related code). Moreover, the timing of operations can be distorted by running additional instructions in parallel that influence the timing of the executable. Acoustic and electromagnetic noise can be generated by directly controlling the hardware, or by performing unrelated (spurious) operations at the same time, with the purpose of increasing the acoustic or electromagnetic noise level.

While such techniques are generally useful for thwarting side-channel attacks, the injection of noise is made dependent on the identification of trigger events. This identification of trigger events is used to enable turning on the "noise injection" at the right moment and turning it off immediately when noise is not needed anymore, as any noise injected artificially may cause loss of performance, or increased energy consumption or heat emission, which may be undesirable in most cases. By identifying the triggers, the noise injection can be activated as fine-granularly as possible, to limit the overhead caused by the activation of the noise injection mode. In addition, in some examples, the amount of noise can be varied, in order to inject (just) as much noise as required in a given scenario.

In connection with FIGS. 1a and 1b, it is assumed that the executable is potentially vulnerable to side-channel attacks. While, in some examples, the executable can be scanned to determine, whether it is vulnerable to side-channel attacks, as an alternative measure, the executable can be provided (e.g., bundled) together with information on whether noise injection is required when executing the executable, i.e., whether the executable is vulnerable to side-channel attacks. This information can be part of a so-called execution manifest. For example, the execution manifest may comprise information on the portions of the executable at which noise should be injected (e.g., at which moments noise should be injected). In other words, the processing circuitry may process an execution manifest that may be bundled/co-packaged with the executable or which may be obtained separately from the executable. Accordingly, as shown in FIG. 1b, the method may comprise processing 110 the execution manifest that is bundled with the executable. The execution manifest indicates whether noise injection is required when executing the executable. In other words, the execution manifest may indicate whether noise injection is required during execution of the executable in general. Additionally, the execution manifest may define the type or types of noise required, specific noise injection means/measures to use, and/or the triggers to identify during execution of the executable. In some examples, the execution manifest may include an execution profile (i.e., profiling information) with information on the triggers to be used included in the execution profile. In this context, profiling information is information on the constituent parts of the executable, with information on memory regions being used and information on transitions between different parts (e.g., functions, or basic blocks) of the executable.

Instead of, or in addition to, using an execution manifest to determine whether the executable is vulnerable to side-channel attacks, the executable may also be analyzed to determine whether the executable is vulnerable, e.g., by scanning for patterns that are known to be vulnerable, by scanning for the use of libraries that are known to be vulnerable and/or by scanning for code patterns that are known to be vulnerable. Therefore, the processing circuitry may determine whether at least a part of the executable may be suspected to be vulnerable to a side-channel attack by processing the executable to determine an execution profile. Accordingly, as shown in FIG. 1b, the method may comprise determining 130 whether at least a part of the executable is suspected to be vulnerable to a side-channel attack by processing 120 the executable to determine an execution profile. In other words, profiling (such as done in the context of profile-guided optimization) may be performed to determine the execution profile, and the execution profile may be used to determine whether at least a part of the executable is suspected to be vulnerable to a side-channel attack.

Further options, apart from the execution manifest and execution profiles, information stored in a database (or more generally, data storage, such as a look-up table, a list, an eXtensible Markup Language file, a Java Script Object Notation file etc.) may be used to determine whether the executable, or a part thereof, is vulnerable to side-channel attacks. Thus, the processing circuitry may determine whether at least a part of the executable is suspected to be vulnerable to a side-channel attack based on a first data storage comprising information on (specific) executables that are vulnerable to a side-channel attack, and/or a second data storage comprising information on libraries (being called by executables) that are vulnerable to a side-channel attack. Thus, no executable-specific execution manifest (or self-determined execution profile) may be required, which may improve scalability. In addition, or alternatively, a computer system-wide policy, a deploy site-wide policy or an enterprise-wide policy, may be used to determine whether noise injection is required, and in particular whether an executable is deemed to be vulnerable to side-channel attacks. Thus, the method may comprise determining 130 whether at least a part of the executable is suspected to be vulnerable to a side-channel attack based on a policy, such as the computer system-wide policy, a deploy site-wide policy or an enterprise-wide policy.

The aforementioned execution profiles, both included in the execution manifest and determined, may also be used to identify the triggers within the executable, and in particular detect occurrence of the triggers during execution of the executable. In particular, the execution profile may comprise information on one or more sections of code and/or one or more memory regions triggering activation or deactivation of the noise injection mode. During execution of the executable, the information on the one or more sections of code and/or the one or more memory regions triggering activation or deactivation of the noise injection mode may be used to identify occurrence of the trickers.

The information on whether the executable (or a part thereof) may also be used to determine, whether the identification of a trigger for activating the noise injection mode is necessary at all. In other words, the processing circuitry may identify the trigger for activating the noise injection mode if at least a part of the executable is suspected to be vulnerable to a side-channel attack. Accordingly, as shown in FIG. 1b, the method may comprise identifying 170 the trigger for activating the noise injection mode if at least a part of the executable is suspected to be vulnerable to a side-channel attack. In other cases, if the executable is not vulnerable, the additional effort can be foregone by not checking for the triggers (and consequently not activating the noise injection mode)

Once it is determined whether noise injection is generally required (due to policy and/or vulnerability), the amount of noise injection may be chosen. In general, while more noise may increase the security with respect to side-channel attacks, more noise may also have a detrimental impact with respect to performance, energy consumption and/or noise emitted by the respective computer system. Therefore, a balance may be struck between the amount of noise injection and the aforementioned impact. For example, the processing circuitry may determine a desired amount of noise injection, and to activate the noise injection mode with the desired amount of noise injection. Accordingly, as shown in FIG. 1b, the method may comprise determining 150 a desired amount of noise injection and activating 180 the noise injection mode with the desired amount of noise injection. This desired amount of noise injection is based on the vulnerability of the executable during execution on a specific computer system. Both the vulnerability of the executable and the specific execution environment of the executable play a role—for example, if several high-precision measurements are necessary for exfiltrating information, a desired amount of noise injection may be lower than in a case where a single or a more coarse measurements suffices. Moreover, on a busy system with a large number of operations being performed concurrently, the base level of noise may be so high that little additional noise may be required for thwarting side-channel attacks. Both aspects may be reflected by the so-called Minimum Traces to Disclosure (MTD) parameter, which indicates how many measurements are required, e.g., on average, to exfiltrate target information or reach a target outcome. For example, the processing circuitry may determine the desired amount of noise injection based on the Minimum Traces to Disclosure, MTD, parameter.

Taking into account the MTD, another metric may be used as an intermediary to determine the desired amount of noise injection—the desired signal to noise ratio. For example, the processing circuitry may determine a desired signal-to-noise ratio for the execution of the executable, and to determine the desired amount of noise injection based on the desired signal-to-noise ratio. Accordingly, as shown in FIG. 1b, the method may comprise determining 140 a desired signal-to-noise ratio (SNR) for the execution of the executable, and determining 150 the desired amount of noise injection based on the desired signal-to-noise ratio. In general, a signal-to-noise ratio (SNR) defines the amount of noise in the useful signal. For example, the signal to noise ratio may be defined by the amount of observations that need to be collected to recover a secret with given probability. For example, the SNR may be determined by the processing circuitry introducing noise and measuring, whether side channel effects still allow discovering the secret. The noise may be increased gradually until measurements show that the probability of leaking the secret are sufficiently small. A threshold for the probability may be set by a user (in the manifest, for example). The desired signal-to-noise ratio can be used as starting point for determining the desired amount of noise injection—if the desired signal to noise ratio (SNR) is known (at which a desired MTD can be achieved), the desired amount of noise injection can be determined by comparing the desired signal to noise ratio with the current or baseline signal to noise ratio (i.e., the signal to noise ratio without injection noise), and choosing the desired amount of noise injection such that the desired SNR is reached. Alternatively, the desired amount of noise injection can be determined without calculating the desired SNR. The current (or baseline) signal or noise ratio can be determined by benchmarking (i.e., self-testing) the execution environment of the executable (to find out, how much noise is already present in the execution environment without additional noise being injected). In other words, the processing circuitry may determine the desired amount of noise injection by performing a self-test at startup of at least one of a runtime environment 102 (as shown in FIG. 1*a*) for executing the executable, a hypervisor 104 hosting a virtual machine being used to execute the executable, an operating system 104 being used to execute the executable, and a computer system 106 being used to execute the executable, e.g., to determine the current or baseline signal to noise ratio. Accordingly, as shown in FIG. 1*b*, the method may comprise determining the desired amount of noise injection by performing 152 a self-test at startup of at least one of the runtime environment, the hypervisor, the operating system the computer system. In addition, or alternatively, a current load of the computer system may be used to determine the desired amount of noise injection (e.g., to estimate the current SNR, which is then used to determine the desired amount of noise injection). In other words, the processing circuitry may determine the desired amount of noise injection further based on a load of a computer system being used to execute the executable.

The desired SNR can vary depending on the executable at hand—as outlined above, if several high-precision measurements are necessary for exfiltrating information, a desired amount of noise injection may be lower than in a case where a single measurement or more coarse measurements suffices. Therefore, the processing circuitry may determine the desired signal-to-noise ratio based on a vulnerability (e.g., a degree of vulnerability) of the executable to side-channel attacks. For example, the desired signal-to-noise ratio may be obtained from an execution manifest that is bundled/co-packaged with the executable or that is obtained separately. For example, the desired signal-to-noise ratio may be chosen such, that, in view of the vulnerability of the executable, a desired MTD can be achieved.

In some cases, the amount of noise being injected may, via the desired amount of noise injection, also be adapted to the scenario at hand. For example, heuristics may be used to determine whether a side-channel attack is currently being performed (e.g., by determining patterns in memory accesses, detecting suspicious use of highly-precise timers), e.g., using widely available techniques. Once it is determined that a side-channel attack is performed, the desired amount of noise injection can be increased, to account for the threat vector. In other words, the processing circuitry may detect a side-channel attack being performed during execution of the executable, and to determine the desired amount of noise injection further based on whether a side-channel attack is (currently) being performed during execution of the executable. Accordingly, as shown in FIG. 1*b*, the method may comprise detecting 154 a side-channel attack being performed during execution of the executable, and determining the desired amount of noise injection further based on whether a side-channel attack is being performed during execution of the executable.

The injection of noise is, in the proposed concept, controlled by the identification of triggers. Triggers may be events or conditions that occur during execution of the executable. For example, the processing circuitry may execute the executable, and identify the trigger (event or condition) during execution of the executable, e.g., based on the aforementioned execution profile. Accordingly, as further shown in FIG. 1*b*, the method may comprise executing 160 the executable, and identifying 170 the trigger (event or condition) during execution of the executable. In some cases, the trigger event may be a coarse-grained event. For example, in a simple, yet less efficient implementation, the trigger event may be the execution of the executable. If the executable, as a whole, is known to be vulnerable, the noise injection mode may be activated during the entire execution of the executable (and deactivated thereafter). In this case, the processing circuitry may identify the trigger to activate or deactivate the noise injection mode with a per-executable granularity, such that the noise injection mode is activated when execution of the executable is started and deactivated when execution of the executable is terminated. In many cases, however, a more fine-grained approach is possible. For example, the processing circuitry may identify the trigger to activate or deactivate the noise injection mode during execution of the executable, such that the noise injection mode is activated when a pre-defined set of instructions is executed, when a pre-defined memory region is accessed, or when a pre-defined library is called, and deactivated thereafter. These conditions or events causing triggers may be derived from the aforementioned execution profile, for example. How such a trigger can be identified depends on the respective event or condition being fulfilled, and where the detection is performed. As shown in FIG. 1*a*, the execution environment comprises multiple layers, such as the runtime environment 102, a hypervisor (e.g., Virtual Machine Manager/Monitor, VMM, (including a microservices/container management/orchestration environment) or Operating System (OS) 104, and the hardware. For example, the execution of a pre-defined set of instructions, access of a memory or call of a library can be detected by the runtime environment 102 and the VMM/OS 104, while the hardware 106 can detect the execution of a pre-defined set of instructions (if the instructions are linked to memory addresses or otherwise identifiable by the hardware) and the access to a specific portion of memory of the hardware.

Depending on the identified trigger, the noise injection mode is activated (or deactivated, if the trigger indicates that the portion of the executable currently executed is not vulnerable or the execution of the executable is terminated), to control the injection of noise during execution of the executable. The noise injection mode is suitable for introducing noise during execution of the executable, such as random or deterministic delays, electromagnetic noise, audio noise, noise caused by random traffic etc. However, activation of the noise injection mode does not affect a correctness and/or validity of the executable. However, the injected noise is injected to affect a usefulness or feasibility of a potential side-channel attack.

In the proposed concept, the injection of noise, and also the identification of the trigger, can be done on multiple levels, which opens up additional degrees of freedom, and also enables application of the concept onto executables that are part of the execution environment, e.g., executables of the runtime environment 102 or executable of the hypervisor/OS 104—as long as there is another layer below that can be used to inject a sufficient amount of noise, the proposed concept can be applied. Accordingly, the processing circuitry may activate or deactivate the noise injection mode in at least one of the runtime environment 102 for executing the executable, the hypervisor 104 hosting a virtual machine being used to execute the executable, an operating system 104 being used to execute the executable and a hardware 104 component of a computer system being used to execute the executable. For example, the apparatus 10 or device 10 may be part of one of more of the runtime environment 102, hypervisor 104, operating system 104, or hardware device 106, and the method may be performed by one of more of the runtime environment 102, hypervisor 104, operating system 104, or hardware device 106. In this context, the runtime environment can include any software component that is required for running the executable, such as an interpreter (in case of an interpreted language), a software virtual machine (such as the Java Virtual Machine, JVM) for executing a bytecode/intermediate representation, a Just-in-Time-compiler, a Docker daemon, a software library etc. The hypervisor can be a virtual machine manager or an environment for hosting bare-metal containers. The operating system may be an operating system being used to operator the computer system, or an operating system being run within a virtual machine. The hardware may be any hardware of the computer system, such as a processor (or Central Processing Unit, CPU), a graphics card (or Graphics Processing Unit, GPU), an Artificial Intelligence (AI) accelerator, an offloading accelerator, a Field-Programmable Gate Array (FPGA), a network interface card (NIC) etc. The aforementioned processing units (CPU, GPU, AI accelerator, FPGA, offloading accelerator etc.) may also be denoted xPU, i.e., an arbitrary type of Processing Unit.

As illustrated in more detail in connection with FIG. 4, each of those elements of the execution environment can be used to inject noise. This is illustrated, in FIG. 4, by the inclusion of a "Fuzzing" module (which is a noise injection module) in the runtime environment 430, the VMM/OS 440 and the hardware 450. However, such a fuzzing module need not necessarily be integrated in all of the levels of the execution environment.

Depending on where the noise is being injected (within the execution environment), different options for injecting noise can be used. In the following, some examples are given with respect to noise that can be injected. They serve merely as examples, as they have been shown to be useful noise injection vectors for the purpose of thwarting side-channel attacks.

For example, one or more of the following measures can be taken via the runtime environment. For example, the processing circuitry may activate or deactivate the noise injection mode in the runtime environment for executing the executable, to activate or deactivate insertion of random delays by the runtime environment, which may be introduced during a jump to another basic block of the executable or during a return from a function. Additionally, or alternatively, the processing circuitry may activate or deactivate the noise injection mode in the runtime environment for executing the executable, to activate or deactivate execution of a pre-defined set of instructions to increase or decrease at least one of execution time, power consumption, heat emission, electromagnetic noise and sound etc. It is to be noted that the aforementioned list of properties to be increased is non-exhaustive, i.e., other properties may be increased or decreased as well. For example, the pre-defined set of instructions may be provided via a database or other data structure of suitable instructions for increasing (or decreasing) the execution time (by activating or deactivating the use of compound instructions, vector instructions, assigning instructions to a performance core vs. an efficiency core etc.), power consumption (by inserting additional instructions requiring additional power, or by selecting between instructions known for drawing more or less power or by executing instructions on a performance core (more power use) or an efficiency core (less power use)), heat emission (by inserting additional instructions causing additional heat, or by selecting between instructions known for causing additional, or less, heat, or by executing instructions on a performance core (more heat) or an efficiency core (less heat)), audio emissions or electromagnetic emissions (by using or avoiding instructions known for producing audio or electromagnetic emissions). Additionally, or alternatively, the processing circuitry may activate or deactivate the noise injection mode in the runtime environment for executing the executable, to activate or deactivate generation of random traffic on a bus of the computer system being used to execute the executable (e.g., by execution instructions causing random traffic on the bus). Additionally, or alternatively, the processing circuitry may activate or deactivate the noise injection mode in the runtime environment for executing the executable, to activate or deactivate execution of an additional computational kernel on a processing unit (e.g., xPU) being used to execute the executable in parallel with the execution of the executable. This can be done to add non-deterministic noise in all of the aspects (emissions, execution time, delays etc.), at the cost of blocking the use of the resources used by the additional computational kernel. This is in particular an option, if the executable is or comprises a compute kernel being executed by the processing unit.

Similar, albeit less fine-granular measures can be taken on the level of the hypervisor, operating system or hardware component, e.g., except for the introduction of random delays at specific points of the execution. For example, the processing circuitry may activate or deactivate the noise injection mode in the hypervisor, operating system or hardware component, to activate or deactivate at least one of execution of a pre-defined set of instructions to increase or decrease at least one of execution time (by activating or deactivating techniques such as simultaneous multi-threading, vector extensions, reducing a cache size etc.), power consumption, heat emission, electromagnetic noise and sound, to activate or deactivate generation of random traffic on a bus of the computer system being used to execute the executable, and/or to activate or deactivate execution of an additional computational kernel on a processing unit being used to execute the executable in parallel with the execution of the executable. These measures may be implemented similar to the examples given above.

It is evident that there is a large repertoire of measures that can be taken to inject noise during execution of the executable. This repertoire can be used to vary the amount of noise, e.g., according to the desired amount of noise injection, which can be derived from the difference between the desired SNR and the current/baseline SNR, and/or which can depend on whether a side-channel attack is currently being performed. Therefore, the processing circuitry may vary the amount of noise injection by selecting at least a subset of measures from a plurality of measures for introducing noise during execution of the executable. Accordingly, the method may comprise varying the amount of noise injection by selecting at least a subset of measures from a plurality of measures for introducing noise during execution of the executable. As outlined above, these measures may comprise one or more of insertion of random delays by the runtime environment, execution of a pre-defined set of instructions to change at least one of power consumption, heat emission, electromagnetic noise and sound, generation of random traffic on a bus of the computer system being used to execute the executable, and execution of an additional computational kernel on a processing unit being used to execute the executable in parallel with the execution of the executable.

The interface circuitry 12 or means for communicating 12 may correspond to one or more inputs and/or outputs for receiving and/or transmitting information, which may be in digital (bit) values according to a specified code, within a module, between modules or between modules of different entities. For example, the interface circuitry 12 or means for communicating 12 may comprise circuitry configured to receive and/or transmit information.

For example, the processing circuitry 14 or means for processing 14 may be implemented using one or more processing units, one or more processing devices, any means for processing, such as a processor, a computer or a programmable hardware component being operable with accordingly adapted software. In other words, the described function of the processing circuitry 14 or means for processing may as well be implemented in software, which is then executed on one or more programmable hardware components. Such hardware components may comprise a general-purpose processor, a Digital Signal Processor (DSP), a micro-controller, etc.

For example, the storage circuitry 16 or means for storing information 16 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 100 may be a server computer system, i.e., a computer system being used to serve functionality, or a workstation computer system.

More details and aspects of the apparatus 10, device 10, method, corresponding computer program and computer system are mentioned in connection with the proposed concept, or one or more examples described above or below (e.g., FIGS. 2a to 4). The apparatus 10, device 10, method, corresponding computer program and computer system may comprise one or more additional optional features corresponding to one or more aspects of the proposed concept, or one or more examples described above or below.

Figure 2A:
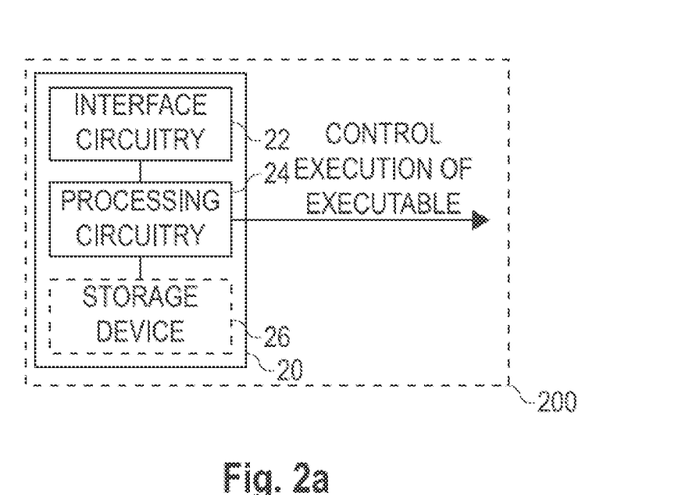
FIG. 2a shows a schematic diagram of an example of another apparatus or device for executing an executable, and of a computer system comprising such an apparatus or device.

FIG. 2a shows a schematic diagram of an example of another apparatus 20 or device 20 for executing an executable, and of a computer system 200 comprising such an apparatus 20 or device 20. The apparatus 20 comprises circuitry to provide the functionality of the apparatus 20. For example, the circuitry of the apparatus 20 may be configured to provide the functionality of the apparatus 20. For example, the apparatus 20 of FIG. 2a comprises interface circuitry 22, processing circuitry 24 and (optional) storage circuitry 26. For example, the processing circuitry 24 may be coupled with the interface circuitry 22 and with the storage circuitry 26. For example, the processing circuitry 24 may provide the functionality of the apparatus, in conjunction with the interface circuitry 22 (for exchanging information, e.g., with other components inside or outside the computer system 200 comprising the apparatus or device 20) and the storage circuitry 26 (for storing information, such as machine-readable instructions). Likewise, the device 20 may comprise means for providing the functionality of the device 20. For example, the means may be configured to provide the functionality of the device 20. The components of the device 20 are defined as component means, which may correspond to, or implemented by, the respective structural components of the apparatus 20. For example, the device 20 of FIG. 2a comprises means for processing 24, which may correspond to or be implemented by the processing circuitry 24, means for communicating 22, which may correspond to or be implemented by the interface circuitry 22, and (optional) means for storing information 26, which may correspond to or be implemented by the storage circuitry 26. In general, the functionality of the processing circuitry 24 or means for processing 24 may be implemented by the processing circuitry 24 or means for processing 24 executing machine-readable instructions. Accordingly, any feature ascribed to the processing circuitry 24 or means for processing 24 may be defined by one or more instructions of a plurality of machine-readable instructions. The apparatus 20 or device 20 may comprise the machine-readable instructions, e.g., within the storage circuitry 26 or means for storing information 26.

The processing circuitry 24 or means for processing 24 is to process an execution manifest, the execution manifest indicating whether activating a noise injection mode is required when executing the executable, with the noise injection mode being suitable for introducing noise during execution of the executable. The processing circuitry 24 or means for processing 24 is to execute the executable based on the execution manifest, by activating or deactivating the noise injection mode based on the execution manifest.

Figure 2B:
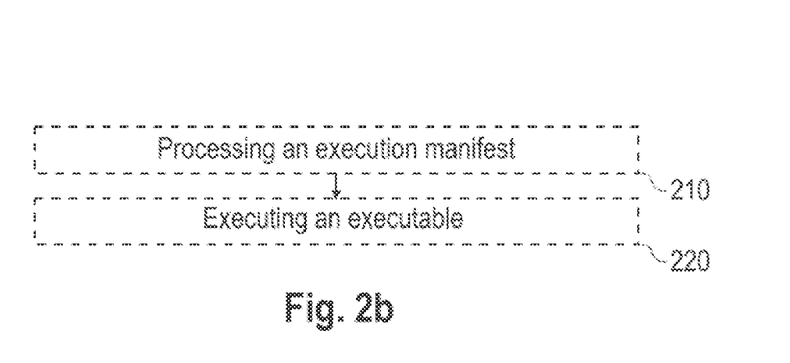
FIG. 2b shows a flow chart of an example of another method for executing an executable.

FIG. 2b shows a flow chart of an example of a corresponding method for executing the executable. The method comprises processing 210 the execution manifest. The method comprises executing 220 the executable based on the execution manifest, by activating or deactivating the noise injection mode based on the execution manifest. For example, the method may be performed by the computer system 200, e.g., by the apparatus 20 or device 20 of the computer system 200.

In the following, the functionality of the apparatus 20, device 20 the method and of corresponding computer program comprising the machine-readable instructions is illustrated with respect to the apparatus 20. Features introduced in connection with the apparatus 20 may likewise be included in the corresponding method and computer program.

Figure 3:
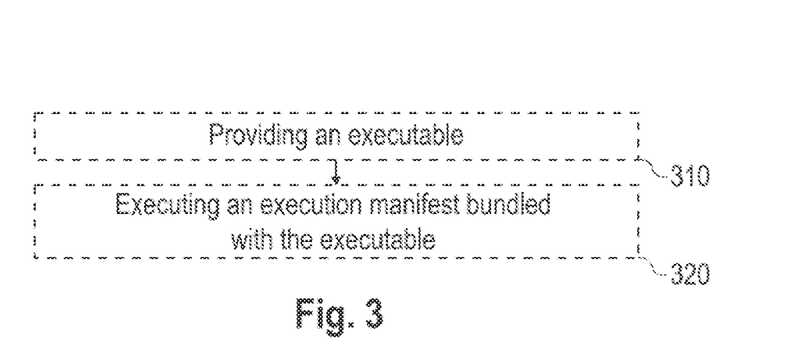
FIG. 3 shows a flow chart of an example of a method for distributing software or firmware.

While FIGS. 1a and 1b relate to the implementation of the selective activation and implementation of the noise injection feature, FIGS. 2a, 2b and 3 relate to the application of the context across multiple machine, with respect to policy and software distribution. To implement the noise injection, the techniques discussed in connection with FIGS. 1a and/or 1b may be used. Accordingly, the apparatus 20, device 20 and/or computer system 200 may be implemented similar to the apparatus 10, device 10 and/or computer system 100 of FIG. 1a, e.g., provide the same or similar functionality as the apparatus 10, device 10 and/or computer system 100 of FIG. 1a. Similarly, the method of FIG. 2b may be implemented similar to the method of FIG. 1b, e.g., it may comprise one or more additional features from the method of FIG. 1b.

Some examples of the present disclosure relate to a paradigm of producing an enterprise-vetted software packages, mandating use of certain countermeasures at runtime and hardware-assisted enforcement of applying these policies. While the idea of allow-listed software is, for example, used by Windows Defender Application Control, in other systems, the allow-list is not conditional on using a side-channel attack shielding technique, such as the side-channel attack shielding technique discussed above. Moreover, in other systems, policy enforcement is not done on the lowest levels of the stack such as the xPU, as illustrated in connection with FIGS. 1a and/or 1b.

In connection with FIGS. 2a and 2b (and 3), the executable is used together with an execution manifest. As outlined in connection with FIGS. 1a and 1b, the execution manifest is used to selectively activate the noise injection mode. For this purpose, the execution manifest may indicate whether noise injection is necessary (at all), i.e., whether the executable is vulnerable to side-channel attacks. In addition, the execution manifest may comprise information for controlling the activation or deactivation of the noise injection model, such as one or more of the MTD, the desired signal-to-noise ratio, the desired amount of noise injection, the execution profile, information on one or more sections of code and/or one or more memory regions triggering activation or deactivation of the noise injection mode etc.

This information may be provided by the original software vendor (and bundled together with the executable). In other words, the execution manifest may be bundled with the executable. Alternatively, the execution manifest may be provided by a third party, i.e., a different entity than the original software vendor. In other words, the execution manifest may be of different origin than the executable. In this case, the manifest may be obtained separate from the executable, or bundled, by the original software vendor, with the executable.

For example, in some examples, the original ISV (Independent Software Vendor)-signed software can be co-packaged (e.g., bundled) together with side-channel attack protection policies (i.e., the execution manifest), and the resulting package may be countersigned by an enterprise IT key (trusted by the runtime) and a runtime policy only allowing such packages to run. In other words, the processing of the execution manifest may be mandated by policy, such that executing the executable may be disabled upon absence of the execution manifest. This policy may be provided or enforced by the hardware system, e.g., by the computer system 200 comprising the apparatus. In other words, the hardware of the computer system may be implemented such, that the executable is only executed, when it is confirmed that an execution manifest is present and followed.

The interface circuitry 22 or means for communicating 22 may correspond to one or more inputs and/or outputs for receiving and/or transmitting information, which may be in digital (bit) values according to a specified code, within a module, between modules or between modules of different entities. For example, the interface circuitry 22 or means for communicating 22 may comprise circuitry configured to receive and/or transmit information.

For example, the processing circuitry 24 or means for processing 24 may be implemented using one or more processing units, one or more processing devices, any means for processing, such as a processor, a computer or a programmable hardware component being operable with accordingly adapted software. In other words, the described function of the processing circuitry 24 or means for processing may as well be implemented in software, which is then executed on one or more programmable hardware components. Such hardware components may comprise a general-purpose processor, a Digital Signal Processor (DSP), a micro-controller, etc.

For example, the storage circuitry 26 or means for storing information 26 may comprise at least one element of the group of a computer readable storage medium, such as a magnetic or optical storage medium, e.g., a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

For example, the computer system 200 may be a server computer system, i.e., a computer system being used to serve functionality, or a workstation computer system.

More details and aspects of the apparatus 20, device 20, method, corresponding computer program and computer system are mentioned in connection with the proposed concept, or one or more examples described above or below (e.g., FIG. 1a to 1b, 3 to 4). The apparatus 20, device 20, method, corresponding computer program and computer system may comprise one or more additional optional features corresponding to one or more aspects of the proposed concept, or one or more examples described above or below.

FIG. 3 shows a flow chart of an example of a method for distributing software or firmware. For example, the software or firmware may comprise an executable, as discussed in connection with FIGS. 1a to 2b. The method comprises providing 310 an executable of the software or firmware. The method comprises providing 320 an execution manifest by bundling the execution manifest with the executable, the execution manifest indicating whether activating a noise injection mode is required when executing the executable, the noise injection mode being suitable for introducing noise during execution of the executable.

While FIGS. 1a and 1b relate to the implementation of the noise injection mode and FIGS. 2a and 2b relate to the enforcement of the noise injection mode via an execution manifest, FIG. 3 relates to the distribution of the executable and execution manifest. The execution manifest is provided, as a bundle together with the executable, e.g., by the original software vendor of the software, or by a third party. In other words, the execution manifest may be bundled with the executable by an original software vendor of the executable. For example, the execution manifest may be bundled with the executable at distribution time, i.e., when the executable is provided for use on a computer system. In this context, bundling refers to the process of providing two entities together. In some examples, the execution manifest is attached to the executable, e.g., as part of a software signature being used to sign the executable. Alternatively, the execution manifest may be provided alongside the executable, i.e., detached and side-by side with the executable.

While the original software vendor is a prime candidate for also providing the execution manifest, the execution manifest may be also provided by a third party. In other words, the vendor of the execution profile/manifest may be a different entity than the original software vendor (the execution profile/manifest itself being monetizable software—i.e. an "external" patch). In other words, a vendor of the execution manifest may be a different entity than an original software vendor of the executable.

The presence of the execution manifest/profile may then be mandated as described in connection with FIGS. 2a and/or 2b. For example, as outlined above, the presence of the execution profile of IT (Information Technology)-set properties may be mandated by IT policy to launch the executable. For example, this IT policy may be enforced by the hardware platform.

More details and aspects of the method are mentioned in connection with the proposed concept, or one or more examples described above or below (e.g., FIG. 1a to 2b, 4). The method may comprise one or more additional optional features corresponding to one or more aspects of the proposed concept, or one or more examples described above or below.

Various example of the present disclosure relate to a concept for side-channel protection for legacy software (without recompiling). Various examples of the present disclosure aim to provide SCA protection without recompiling, e.g., in cases, where the executable cannot be patched, or where a patch is not available, even in the presence of known-vulnerable code, changes to it are impossible.

Typical countermeasures for SCA class of attacks can be divided into two main categories-eliminating/limiting the leakage of additional information, and "distorting" the additional information in a way that it cannot be correlated back to the secret data. The former (eliminating/limiting the leakage of additional information) typically involves a rebuild/redeploy, and while it is the most obvious and effective response, it may be impossible, too late, or too costly (e.g., with respect to software re-validation), so it does not address all the use cases. The latter ("distorting" the additional information), when performed at a whole-executable level, boils down to running the application in a "shielded" container (e.g., putting it inside an Software Guard Extensions (SGX) enclave, Operating System (OS) sandbox, etc.) where its leakage cannot be easily observed by an attacker (or access to attacker's tools e.g., high-frequency timers is limited). The contemporary software preventions (performed at execute time), incur significant overhead (e.g., using Gramine to run the entire app in SGX), plus can be bypassed by a local adversary who can still exploit the side-channels if the software can just be run without the protections enabled.

In contrast to the above mitigations, the proposed concept, at least if implemented at a hardware, or Virtual Machine Manager, VMM, level, is pervasive and cannot be side-stepped easily, while also allowing to be deployed against existing binary, whilst retaining assurances about its correctness.

The proposed concept is based on introducing a special mode of operation ("the noise injection mode" introduced in connection with FIGS. 1a to 1b) of the execution environment (be it hardware, OS/VMM or runtime environment), which, without invalidating (u)architectural constraints, is capable of injecting "noise" into code execution, thus masking side-channel leakage. While, for power/performance reasons, such a "noisy" mode of operation naturally should not be enabled permanently, in the proposed concept, the special mode of operation is only selectively toggled on, when (and only when) sensitive sections of code are running. Moreover, the proposed concept provides a non-invasive method of injecting noise itself, so that correctness/purpose of program's operation is retained.

In the presence of possibly vulnerable software, the proposed concept allows running those workloads with additional protections, without changing the core software, which allows securing a number of workloads that were previously not protected.

The proposed concept may be implemented at various elements of the stack, for example at the VMM/OS-level, as well as on the hardware level (e.g., at an xPU, an arbitrary processing unit, such as a Central Processing Unit, a Graphics Processing Unit, a Compute Accelerator, a Machine-Learning Accelerator, a networking offloading unit etc.). When combined with a technique to selectively toggle this mode, and based on software- or hardware-assisted detection (e.g., using Intel® Thread Detection Technology and Processor Trace), the performance overhead may be well under 5%, allowing to significantly boost security by simply running the same workload on newer CPUs, without the need to resort to Trusted Execution Environment protections.

Figure 4:
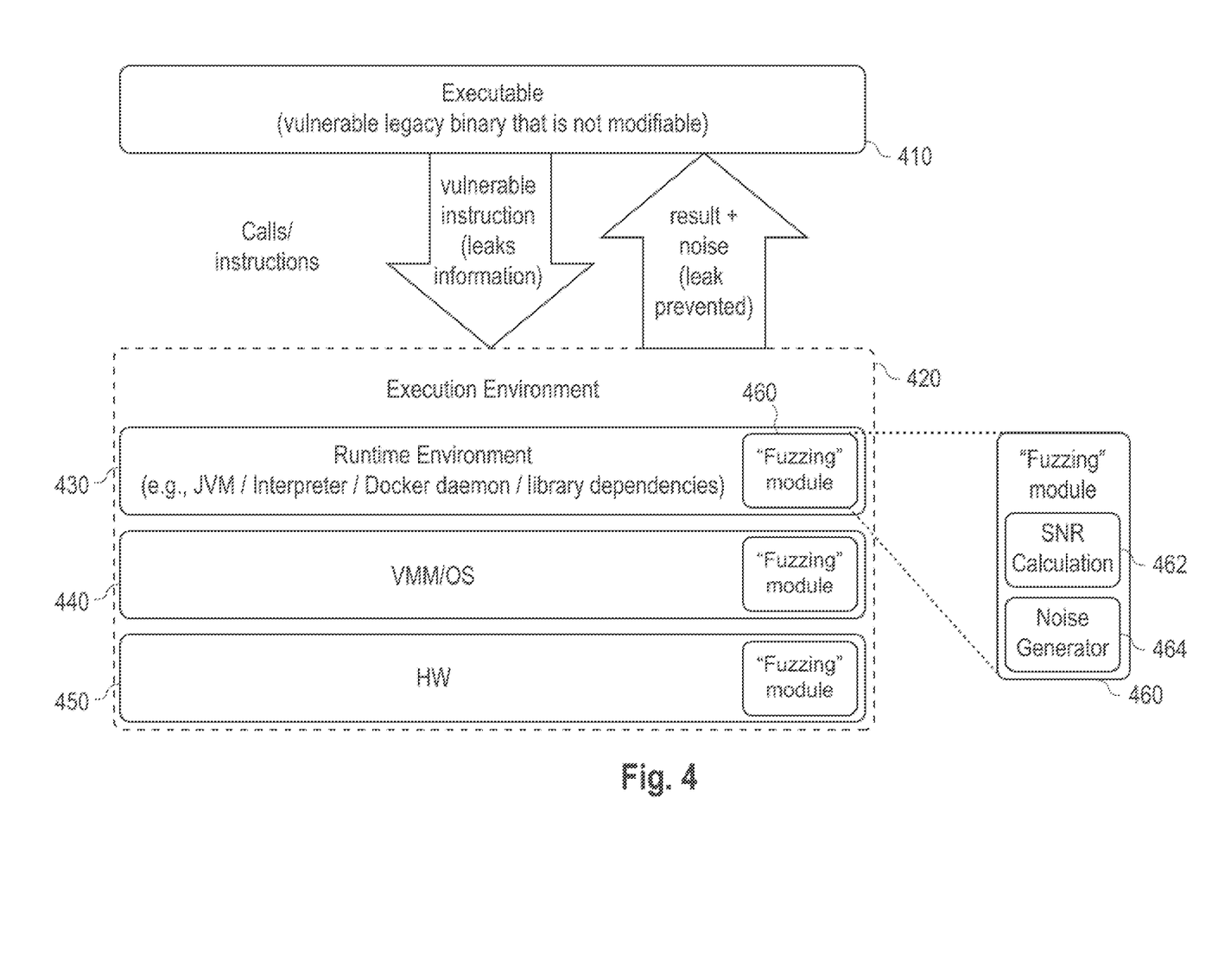
FIG. 4 shows a schematic diagram of components of an example of a concept for executing an executable.

FIG. 4 shows a schematic diagram of components of an example of a concept for executing an executable, together with an executable 410 which is the protection target. FIG. 4 shows the executable 410 (which may be a legacy binary that is not modifiable) and an execution environment 420, which includes a runtime environment 430 (such as a virtual machine for executing an intermediate representation (e.g., a bytecode), such as the JVM, an interpreter, a Docker daemon or library dependencies), a Virtual Machine Manager/Operating System (VMM/OS) 440, and the Hardware (HW) 450. Each of the components of the execution environment 420 include a "fuzzing" (noise injection) module 460, which includes a SNR (Signal-to-Noise-Ratio) calculation component 462 (to calculate the amount of noise based on a Minimum Traces to Disclosure, MTD, metric) and a Noise Generator component (to generate a given type and/or amount of noise) 464. The fuzzing module 460 can be implemented in software and/or hardware, thus it can operate on some or all levels (Runtime Environment 430, VMM/OS 440, Hardware 450).

As depicted, the concept for executing an executable may be implemented at any/all levels of the compute stack, including in the hardware 450. While the executable 410 is visualized as a Ring-3 application, in fact the protection includes any code, as long as there's a N-$1^{th}$ layer of the stack 430-340 capable of deploying the countermeasures (e.g. a legacy OS itself can be protected by a hardware-backed "fuzzing" module).

In the present disclosure, the focus is on the method of protecting the "vulnerable instruction(s)" issues, and not the details of methods used to identify them. The triggers of what kicks-in the protections may span from a straight-forward approach (e.g., "as long code from executable/library X runs"), through a fully instrumented approach (e.g., a software "patch" profile, compatible with an instrumentation tool, triggering the protection exactly at specific code offset, memory access . . . ) to an execution profile driven approach, allowing dynamic determination of such sections. While the techniques for identifying the triggering condition (e.g., based on an execution profile) are not the focus of the application, the temporary or temporal deployment of countermeasures is.

The proposed concept introduces a "Fuzzing" module (460) which may be implemented at any or all of the compute stack layers. For example, the fuzzing module 460 may be implemented at the Interpreter/JIT compiler/Runtime level 430, at the OS/VMM level 440, and/or at the hardware level 450 (as depicted). Depending on the layer of application, the jamming signal (noise) injected may have a different property. For example, the protection may range from, at the runtime-level, extending the observed call duration by adding a "sleep" statement . . . all the way to, at the hardware level, selectively disabling or altering certain micro-architectural optimizations such as speculative execution, adding hardware-level noise whilst leveraging physical properties of particular die design and the like. The "Fuzzing" module 460 may comprise a SNR calculation module 462 and a Noise generator 464. The SNR calculation module's role is to, given a Minimum Traces to Disclosure (MTD) target calculate the amount of noise required and control the noise generator accordingly. The MTD is a parameter that is determined depending on a protection level required (either determined per-workload (e.g., pre-selected by the operator and part of executable's signed manifest, which is checked by the execution environment) or a system-wide target (same value for the whole system/layer), depending on a current system's performance/characteristics (property of the "Fuzzing module", possibly static or determined using a self-test/benchmark performed during startup), and/or (optionally) depending on a current SCA "threat level" (i.e., if a probable SCA attack is detected by the runtime, using any of the existing methods (e.g., T. Vateva-Gurova and N. Suri, "On the Detection of Side-Channel Attacks," 2018 *IEEE 23rd Pacific Rim International Symposium on Dependable Computing (PRDC)*, Taipei, Taiwan, 2018, pp. 185-186, doi: 10.1109/PRDC.2018.00031, or H. Wang, H. Sayadi, S. Rafatirad, A. Sasan and H. Homayoun, "SCARF: Detecting Side-Channel Attacks at Real-time using Low-level Hardware Features," 2020 *IEEE 26th International Symposium on On-Line Testing and Robust System Design (IOLTS)*, Napoli, Italy. 2020, pp. 1-6, doi: 10.1109/IOLTS50870.2020.9159708) the MTD is increased). The Noise generator is used to help thwart SCAs by affecting (e.g., jamming and/or negating) SCA emissions (such as execution time), but without changing the architectural invariants (i.e., changes do not affect software correctness or its overall execution and can be considered micro-architectural).

For example, one or more of the following noise patterns may be used. For example, random delays may be added to instruction/function call (depending on the stack layer) returns. For example, if the protection target is a "non-constant time string comparison" target (such as calling memcmp( ) on a password), the "fuzzer" (noise injector) implemented at an OS level may add extra sleep time before returning (where the time to sleep can be determined by the SNR ratio, and may be both random as well as "fixed", making all subsequent invocations fixed-time). For example, extra (random) traffic may be created on buses (generated either by HW or SW). For example, power-hungry instructions may be added. For example, power consumption and heat emission may be increased or decreased (e.g., by software running extra power-hungry instructions or using specialized hardware module that can manipulate power consumption). For example, a "tethered" core (compute kernel) may be used within the same xPU package to execute an "anti-instruction" (cancelling out or limiting the overall SCA leakage at a package level). For example, other additional emissions may be introduced (e.g., sound or radiation, typically on the hardware level).

The core of the present concept are not the SCA countermeasures themselves, but rather the selectiveness of enabling it at specific windows of runtime execution and the idea of "patching" the vulnerable code at a N−1th execution layer, without recompiling.

While the method applies mostly to legacy/existing software, some countermeasures may very much be compiled into the executable for extra protection (in which case the proposed concept does not depend on extra stimulus for enabling/disabling the "fuzzing" mode). In this case, the trigger identification may be supported by a status variable, register or application programming interface call included in the executable.

In the following, some examples of the present disclosure are presented:

An example (e.g., example 1) relates to an apparatus (10) for executing an executable, the apparatus comprising interface (12) circuitry, machine-readable instructions, and processing circuitry (14) for executing the machine-readable instructions to identify, for the executable, a trigger to activate or deactivate a noise injection mode during execution of the executable, the noise injection mode being suitable for introducing noise during execution of the executable. The processing circuitry is to execute the machine-readable instructions to activate or deactivate the noise injection mode based on the identified trigger.

Another example (e.g., example 2) relates to a previously described example (e.g., example 1) or to any of the examples described herein, further comprising that the processing circuitry is to execute the machine-readable instructions to activate or deactivate the noise injection mode in at least one of a runtime environment for executing the executable, a hypervisor hosting a virtual machine being used to execute the executable, an operating system being used to execute the executable and a hardware component of a computer system being used to execute the executable.

Another example (e.g., example 3) relates to a previously described example (e.g., example 2) or to any of the examples described herein, further comprising that the processing circuitry is to execute the machine-readable instructions to activate or deactivate the noise injection mode in the runtime environment for executing the executable, to activate or deactivate at least one of insertion of random delays by the runtime environment, execution of a pre-defined set of instructions to increase or decrease at least one of execution time, power consumption, heat emission, electromagnetic noise and sound, generation of random traffic on a bus of the computer system being used to execute the executable, and execution of an additional computational kernel on a processing unit being used to execute the executable in parallel with the execution of the executable.

Another example (e.g., example 4) relates to a previously described example (e.g., one of the examples 2 to 3) or to any of the examples described herein, further comprising that the processing circuitry is to execute the machine-readable instructions to activate or deactivate the noise injection mode in the hypervisor, operating system or hardware component, to activate or deactivate at least one of execution of a pre-defined set of instructions to increase or decrease at least one of execution time, power consumption, heat emission, electromagnetic noise and sound, generation of random traffic on a bus of the computer system being used to execute the executable, and execution of an additional computational kernel on a processing unit being used to execute the executable in parallel with the execution of the executable.

Another example (e.g., example 5) relates to a previously described example (e.g., one of the examples 1 to 4) or to any of the examples described herein, further comprising that the processing circuitry is to execute the machine-readable instructions to identify the trigger for activating the noise injection mode if at least a part of the executable is suspected to be vulnerable to a side-channel attack.

Another example (e.g., example 6) relates to a previously described example (e.g., example 5) or to any of the examples described herein, further comprising that the processing circuitry is to execute the machine-readable instructions to determine whether at least a part of the executable is suspected to be vulnerable to a side-channel attack based on at least one of a first data storage comprising information on executables that are vulnerable to a side-channel attack, a second data storage comprising information on libraries that are vulnerable to a side-channel attack, an execution manifest that is bundled with the executable, an execution profile that is bundled with the executable, a computer system-wide policy, a deploy site-wide policy and an enterprise-wide policy.

Another example (e.g., example 7) relates to a previously described example (e.g., one of the examples 5 to 6) or to any of the examples described herein, further comprising that the processing circuitry is to execute the machine-readable instructions to determine whether at least a part of the executable is suspected to be vulnerable to a side-channel attack by processing the executable to determine an execution profile.

Another example (e.g., example 8) relates to a previously described example (e.g., example 7) or to any of the examples described herein, further comprising that the execution profile comprises information on one or more sections of code and/or one or more memory regions triggering activation or deactivation of the noise injection mode.

Another example (e.g., example 9) relates to a previously described example (e.g., one of the examples 1 to 8) or to any of the examples described herein, further comprising that the processing circuitry is to execute the machine-readable instructions to identify the trigger to activate or deactivate the noise injection mode with a per-executable granularity, such that the noise injection mode is activated when execution of the executable is started and deactivated when execution of the executable is terminated.

Another example (e.g., example 10) relates to a previously described example (e.g., one of the examples 1 to 9) or to any of the examples described herein, further comprising that the processing circuitry is to execute the machine-readable instructions to identify the trigger to activate or deactivate the noise injection mode during execution of the executable, such that the noise injection mode is activated when a pre-defined set of instructions is executed, when a pre-defined memory region is accessed, or when a pre-defined library is called, and deactivated thereafter.

Another example (e.g., example 11) relates to a previously described example (e.g., one of the examples 1 to 10) or to any of the examples described herein, further comprising that the processing circuitry is to execute the machine-readable instructions to determine a desired amount of noise injection, and to activate the noise injection mode with the desired amount of noise injection.

Another example (e.g., example 12) relates to a previously described example (e.g., example 11) or to any of the examples described herein, further comprising that the processing circuitry is to execute the machine-readable instructions to determine a desired signal-to-noise ratio for the execution of the executable, and to determine the desired amount of noise injection based on the desired signal-to-noise ratio.

Another example (e.g., example 13) relates to a previously described example (e.g., example 12) or to any of the examples described herein, further comprising that the processing circuitry is to execute the machine-readable instructions to determine the desired signal-to-noise ratio based on a vulnerability of the executable to side-channel attacks.

Another example (e.g., example 14) relates to a previously described example (e.g., one of the examples 12 to 13) or to any of the examples described herein, further comprising that the processing circuitry is to execute the machine-readable instructions to obtain the desired signal-to-noise ratio from an execution manifest that is bundled with the executable.

Another example (e.g., example 15) relates to a previously described example (e.g., one of the examples 12 to 14) or to any of the examples described herein, further comprising that the processing circuitry is to execute the machine-readable instructions to determine the desired amount of noise injection further based on a load of a computer system being used to execute the executable.

Another example (e.g., example 16) relates to a previously described example (e.g., one of the examples 12 to 15) or to any of the examples described herein, further comprising that the processing circuitry is to execute the machine-readable instructions to determine the desired amount of noise injection by performing a self-test at startup of at least one of a runtime environment for executing the executable, a hypervisor hosting a virtual machine being used to execute the executable, an operating system being used to execute the executable, and a computer system being used to execute the executable.

Another example (e.g., example 17) relates to a previously described example (e.g., one of the examples 12 to 16) or to any of the examples described herein, further comprising that the processing circuitry is to execute the machine-readable instructions to determine the desired amount of noise injection based on a Minimum Traces to Disclosure, MTD, parameter.

Another example (e.g., example 18) relates to a previously described example (e.g., one of the examples 12 to 17) or to any of the examples described herein, further comprising that the processing circuitry is to execute the machine-readable instructions to detect a side-channel attack being performed during execution of the executable, and to determine the desired amount of noise injection further based on whether a side-channel attack is being performed during execution of the executable.

Another example (e.g., example 19) relates to a previously described example (e.g., one of the examples 11 to 18) or to any of the examples described herein, further comprising that the processing circuitry is to execute the machine-readable instructions to vary the amount of noise injection by selecting at least a subset of measures from a plurality of measures for introducing noise during execution of the executable.

Another example (e.g., example 20) relates to a previously described example (e.g., example 19) or to any of the examples described herein, further comprising that the plurality of measures for introducing noise comprises one or more of insertion of random delays by the runtime environment, execution of a pre-defined set of instructions to change at least one of power consumption, heat emission, electromagnetic noise and sound, generation of random traffic on a bus of the computer system being used to execute the executable, and execution of an additional computational kernel on a processing unit being used to execute the executable in parallel with the execution of the executable.

Another example (e.g., example 21) relates to a previously described example (e.g., one of the examples 1 to 20) or to any of the examples described herein, further comprising that the noise injection mode does not affect a correctness and/or validity of the executable.

Another example (e.g., example 22) relates to a previously described example (e.g., one of the examples 1 to 21) or to any of the examples described herein, further comprising that the processing circuitry is to execute the machine-readable instructions to process an execution manifest that is bundled with the executable, the execution manifest indicating whether noise injection is required when executing the executable, and to execute the executable based on the execution manifest.

An example (e.g., example 23) relates to a computer system (100) comprising the apparatus according to one of the examples 1 to 22 (or according to any other example).

An example (e.g., example 24) relates to an apparatus (20) for executing an executable, the apparatus comprising interface (22) circuitry, machine-readable instructions, and processing circuitry (24) for executing the machine-readable instructions to process an execution manifest, the execution manifest indicating whether activating a noise injection mode is required when executing the executable, the noise injection mode being suitable for introducing noise during execution of the executable. The processing circuitry is to execute the machine-readable instructions to execute the executable based on the execution manifest, by activating or deactivating the noise injection mode based on the execution manifest.

Another example (e.g., example 25) relates to a previously described example (e.g., example 24) or to any of the examples described herein, further comprising that the execution manifest is bundled with the executable.

Another example (e.g., example 26) relates to a previously described example (e.g., example 24) or to any of the examples described herein, further comprising that the manifest is obtained separate from the executable.

Another example (e.g., example 27) relates to a previously described example (e.g., one of the examples 24 to 26) or to any of the examples described herein, further comprising that the execution manifest is of different origin than the executable.

Another example (e.g., example 28) relates to a previously described example (e.g., one of the examples 24 to 27) or to any of the examples described herein, further comprising that the processing of the execution manifest is mandated by policy, such that executing the executable is disabled upon absence of the execution manifest.

Another example (e.g., example 29) relates to a previously described example (e.g., one of the examples 24 to 28) or to any of the examples described herein, further comprising that the policy is provided or enforced by a computer system (200) comprising the apparatus.

An example (e.g., example 30) relates to a computer system (200) comprising the apparatus (20) according to one of the examples 24 to 29 (or according to any other example).

An example (e.g., example 31) relates to an apparatus (10) for executing an executable, the apparatus comprising processing circuitry (14) configured to identify, for the executable, a trigger to activate or deactivate a noise injection mode during execution of the executable, the noise injection mode being suitable for introducing noise during execution of the executable. The processing circuitry is configured to activate or deactivate the noise injection mode based on the identified trigger.

An example (e.g., example 32) relates to a device (10) for executing an executable, the device (10) comprising means for processing (14) for identifying, for the executable, a trigger to activate or deactivate a noise injection mode during execution of the executable, the noise injection mode being suitable for introducing noise during execution of the executable. The means for processing is for activating or deactivating the noise injection mode based on the identified trigger.

An example (e.g., example 33) relates to an apparatus (20) for executing an executable, the apparatus comprising processing circuitry (24) configured to process an execution manifest, the execution manifest indicating whether activating a noise injection mode is required when executing the executable, the noise injection mode being suitable for introducing noise during execution of the executable. The processing circuitry is configured to execute the executable based on the execution manifest, by activating or deactivating the noise injection mode based on the execution manifest.

An example (e.g., example 34) relates to a device (20) for executing an executable, the device comprising means for processing (24) for processing an execution manifest, the execution manifest indicating whether activating a noise injection mode is required when executing the executable, the noise injection mode being suitable for introducing noise during execution of the executable. The means for processing is further for executing the executable based on the execution manifest, by activating or deactivating the noise injection mode based on the execution manifest.

An example (e.g., example 35) relates to a method for executing an executable, the method comprising identifying (170), for the executable, a trigger to activate or deactivate a noise injection mode during execution of the executable, the noise injection mode being suitable for introducing noise during execution of the executable. The method comprises activating or deactivating (180) the noise injection mode based on the identified trigger.

Another example (e.g., example 36) relates to a previously described example (e.g., example 35) or to any of the examples described herein, further comprising that the method comprises identifying (180) the trigger for activating the noise injection mode if at least a part of the executable is suspected to be vulnerable to a side-channel attack.

Another example (e.g., example 37) relates to a previously described example (e.g., example 36) or to any of the examples described herein, further comprising that the method comprises determining (130) whether at least a part of the executable is suspected to be vulnerable to a side-channel attack based on at least one of a first data storage comprising information on executables that are vulnerable to a side-channel attack, a second data storage comprising information on libraries that are vulnerable to a side-channel attack, an execution manifest that is bundled with the executable, an execution profile that is bundled with the executable, a computer system-wide policy, a deploy site-wide policy and an enterprise-wide policy.

Another example (e.g., example 38) relates to a previously described example (e.g., example 37) or to any of the examples described herein, further comprising that the method comprises determining (130) whether at least a part of the executable is suspected to be vulnerable to a side-channel attack by processing (120) the executable to determine an execution profile.

Another example (e.g., example 39) relates to a previously described example (e.g., one of the examples 35 to 38) or to any of the examples described herein, further comprising that the method comprises determining (150) a desired amount of noise injection, and activating (180) the noise injection mode with the desired amount of noise injection.

Another example (e.g., example 40) relates to a previously described example (e.g., example 39) or to any of the examples described herein, further comprising that the method comprises determining (140) a desired signal-to-noise ratio for the execution of the executable, and determining (150) the desired amount of noise injection based on the desired signal-to-noise ratio.

Another example (e.g., example 41) relates to a previously described example (e.g., example 40) or to any of the examples described herein, further comprising that the method comprises determining the desired signal-to-noise ratio based on a vulnerability of the executable to side-channel attacks.

Another example (e.g., example 42) relates to a previously described example (e.g., one of the examples 40 to 41) or to any of the examples described herein, further comprising that Another example (e.g., example 43) relates to a previously described example (e.g., one of the examples 39 to 43) or to any of the examples described herein, further comprising that the method comprises determining the desired amount of noise injection by performing (152) a self-test at startup of at least one of a runtime environment for executing the executable, a hypervisor hosting a virtual machine being used to execute the executable, an operating system being used to execute the executable, and a computer system being used to execute the executable.

Another example (e.g., example 44) relates to a previously described example (e.g., one of the examples 39 to 43) or to any of the examples described herein, further comprising that the method comprises detecting (154) a side-channel attack being performed during execution of the executable, and determining the desired amount of noise injection further based on whether a side-channel attack is being performed during execution of the executable.

Another example (e.g., example 45) relates to a previously described example (e.g., one of the examples 35 to 44) or to any of the examples described herein, further comprising that the method comprises varying the amount of noise injection by selecting at least a subset of measures from a plurality of measures for introducing noise during execution of the executable.

Another example (e.g., example 46) relates to a previously described example (e.g., one of the examples 35 to 45) or to any of the examples described herein, further comprising that the method comprises processing (110) an execution manifest that is bundled with the executable, the execution manifest indicating whether noise injection is required when executing the executable, and executing (160) the executable based on the execution manifest.

An example (e.g., example 47) relates to a computer system (100) being configured to perform the method according to one of the examples 35 to 46 (or according to any other example).

An example (e.g., example 48) relates to a method for executing an executable, the method comprising processing (210) an execution manifest, the execution manifest indicating whether activating a noise injection mode is required when executing the executable, the noise injection mode being suitable for introducing noise during execution of the executable. The method comprises executing (220) the executable based on the execution manifest, by activating or deactivating the noise injection mode based on the execution manifest.

An example (e.g., example 49) relates to a computer system (200) being configured to perform the method according to example 48.

An example (e.g., example 50) relates to a method for distributing software or firmware, the method comprising providing (310) an executable of the software or firmware. The method comprises providing (320) an execution manifest by bundling the execution manifest with the executable, the execution manifest indicating whether activating a noise injection mode is required when executing the executable, the noise injection mode being suitable for introducing noise during execution of the executable.

Another example (e.g., example 51) relates to a previously described example (e.g., example 50) or to any of the examples described herein, further comprising that the execution manifest is bundled with the executable by an original software vendor of the executable.

Another example (e.g., example 52) relates to a previously described example (e.g., one of the examples 50 to 51) or to any of the examples described herein, further comprising that the manifest is provided alongside the executable.

Another example (e.g., example 53) relates to a previously described example (e.g., one of the examples 50 to 52) or to any of the examples described herein, further comprising that a vendor of the execution manifest is a different entity than an original software vendor of the executable.

An example (e.g., example 54) relates to a system comprising the apparatus (10) or device (10) of one of the examples 1 to 23, 31 to 32 (or according to any other example) and the apparatus (20) or device (20) of one of the examples 24 to 30, 33 to 34 (or according to any other example).

An example (e.g., example 55) relates to a non-transitory machine-readable storage medium including program code, when executed, to cause a machine to perform the method of one of the examples 35 to 46 (or according to any other example) or the method according to example 48 (or according to any other example).

An example (e.g., example 56) relates to a computer program having a program code for performing the method of one of the examples 35 to 46 (or according to any other example) or the method according to example 48 (or according to any other example) when the computer program is executed on a computer, a processor, or a programmable hardware component.

An example (e.g., example 57) relates to a machine-readable storage including machine readable instructions, when executed, to implement a method or realize an apparatus as claimed in any pending claim or shown in any example.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, processor or other programmable hardware component. Thus, steps, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (field) programmable logic arrays ((F) PLAs), (field) programmable gate arrays ((F) PGAs), graphics processor units (GPU), application-specific integrated circuits (ASICs), integrated circuits (ICs) or system-on-a-chip (SoCs) systems programmed to execute the steps of the methods described above.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

The disclosed methods, apparatuses, and systems are not to be construed as limiting in any way. Instead, the present disclosure is directed toward all novel and nonobvious features and aspects of the various disclosed examples, alone and in various combinations and subcombinations with one another. The disclosed methods, apparatuses, and systems are not limited to any specific aspect or feature or combination thereof, nor do the disclosed examples require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. An apparatus for executing an executable, the apparatus comprising interface circuitry, machine-readable instructions, and processing circuitry for executing the machine-readable instructions to:

identify, for the executable, a trigger to activate or deactivate a noise injection mode during execution of the executable, the noise injection mode being suitable for introducing noise during execution of the executable;

obtain, from an execution manifest bundled with the executable, a desired signal-to-noise ratio for execution of the executable;

determine a desired amount of noise injection based on the desired signal-to-noise ratio; and activate or deactivate the noise injection mode with the desired amount of noise injection based on the identified trigger.

2. The apparatus according to claim 1, wherein the processing circuitry is to execute the machine-readable instructions to activate or deactivate the noise injection mode in at least one of a runtime environment for executing the executable, a hypervisor hosting a virtual machine being used to execute the executable, an operating system being used to execute the executable and a hardware component of a computer system being used to execute the executable.

3. The apparatus according to claim 2, wherein the processing circuitry is to execute the machine-readable instructions to activate or deactivate the noise injection mode in the runtime environment for executing the executable, to activate or deactivate at least one of insertion of random delays by the runtime environment, execution of a pre-defined set of instructions to increase or decrease at least one of execution time, power consumption, heat emission, electromagnetic noise and sound, generation of random traffic on a bus of the computer system being used to execute the executable, and execution of an additional computational kernel on a processing unit being used to execute the executable in parallel with the execution of the executable.

4. The apparatus according to claim 2, wherein the processing circuitry is to execute the machine-readable instructions to activate or deactivate the noise injection mode in the hypervisor, operating system or hardware component, to activate or deactivate at least one of execution of a pre-defined set of instructions to increase or decrease at least one of execution time, power consumption, heat emission, electromagnetic noise and sound, generation of random traffic on a bus of the computer system being used to execute the executable, and execution of an additional computational kernel on a processing unit being used to execute the executable in parallel with the execution of the executable.

5. The apparatus according to claim 1, wherein the processing circuitry is to execute the machine-readable instructions to identify the trigger for activating the noise injection mode if at least a part of the executable is suspected to be vulnerable to a side-channel attack.

6. The apparatus according to claim 5, wherein the processing circuitry is to execute the machine-readable instructions to determine whether at least a part of the executable is suspected to be vulnerable to a side-channel attack based on at least one of a first data storage comprising information on executables that are vulnerable to a side-channel attack, a second data storage comprising information on libraries that are vulnerable to a side-channel attack, an execution manifest that is bundled with the executable, an execution profile that is bundled with the executable, a computer system-wide policy, a deploy site-wide policy and an enterprise-wide policy.

7. The apparatus according to claim 5, wherein the processing circuitry is to execute the machine-readable instructions to determine whether at least a part of the executable is suspected to be vulnerable to a side-channel attack by processing the executable to determine an execution profile, the execution profile comprising information on one or more sections of code and/or one or more memory regions triggering activation or deactivation of the noise injection mode.

8. The apparatus according to claim 1, wherein the processing circuitry is to execute the machine-readable instructions to identify the trigger to activate or deactivate the noise injection mode during execution of the executable, such that the noise injection mode is activated when a pre-defined set of instructions is executed, when a pre-defined memory region is accessed, or when a pre-defined library is called, and deactivated thereafter.

9. The apparatus according to claim 1, wherein the processing circuitry is to execute the machine-readable instructions to adjust the desired signal-to-noise ratio based on a vulnerability of the executable to side-channel attacks.

10. The apparatus according to claim 1, wherein the processing circuitry is to execute the machine-readable instructions to determine the desired amount of noise injection further based on a load of a computer system being used to execute the executable.

11. The apparatus according to claim 1, wherein the processing circuitry is to execute the machine-readable instructions to determine the desired amount of noise injection by performing a self-test at startup of at least one of a runtime environment for executing the executable, a hypervisor hosting a virtual machine being used to execute the executable, an operating system being used to execute the executable, and a computer system being used to execute the executable.

12. The apparatus according to claim 1, wherein the processing circuitry is to execute the machine-readable instructions to determine the desired amount of noise injection based on a Minimum Traces to Disclosure, MTD, parameter.

13. The apparatus according to claim 1, wherein the processing circuitry is to execute the machine-readable instructions to detect a side-channel attack being performed during execution of the executable, and to determine the desired amount of noise injection further based on whether a side-channel attack is being performed during execution of the executable.

14. The apparatus according to claim 1, wherein the processing circuitry is to execute the machine-readable instructions to process an execution manifest that is bundled with the executable, the execution manifest indicating whether noise injection is required when executing the executable, and to execute the executable based on the execution manifest.

15. A method for executing an executable, the method comprising:
identifying, for the executable, a trigger to activate or deactivate a noise injection mode during execution of the executable, the noise injection mode being suitable for introducing noise during execution of the executable;
obtaining, from an execution manifest bundled with the executable, a desired signal-to-noise ratio for execution of the executable;
determining a desired amount of noise injection based on the desired signal-to-noise ratio; and
activating or deactivating the noise injection mode with the desired amount of noise injection based on the identified trigger.

16. A non-transitory machine-readable storage medium including program code, when executed, to cause a machine to perform the method of claim 15.

17. A method for executing an executable, the method comprising:
processing an execution manifest, the execution manifest:
indicating whether activating a noise injection mode is required when executing the executable, the noise injection mode being suitable for introducing noise during execution of the executable,
specifying a desired signal-to-noise ratio for execution of the executable;

determining, on the basis of the desired signal-to-noise ratio, a desired amount of noise injection; and executing the executable based on the execution manifest, by activating or deactivating the noise injection mode with the desired amount of noise injection.

18. The method according to claim 17, wherein the execution manifest is bundled with the executable, or wherein the manifest is obtained separate from the executable.

19. The method according to claim 18, wherein the processing of the execution manifest is mandated by policy, such that executing the executable is disabled upon absence of the execution manifest.

20. A non-transitory machine-readable storage medium including program code, when executed, to cause a machine to perform the method of claim 19.

21. A method for distributing software or firmware, the method comprising:

providing an executable of the software or firmware; and providing an execution manifest by bundling the execution manifest with the executable, the execution manifest:

indicating whether activating a noise injection mode is required when executing the executable, the noise injection mode being suitable for introducing noise during execution of the executable, and specifying a desired signal-to-noise ratio for execution of the executable, wherein the desired amount of noise injection is determined based on the desired signal-to-noise ratio.

22. The method according to claim 21, wherein the execution manifest is bundled with the executable by an original software vendor of the executable, or wherein the manifest is provided alongside the executable.

* * * * *